United States Patent [19]

Michael

[11] 4,225,036
[45] Sep. 30, 1980

[54] ENDLESS BELT CONVEYOR

[75] Inventor: Thomas H. Michael, Blakesburg, Iowa

[73] Assignee: Deere & Company, Moline, Ill.

[21] Appl. No.: 830,921

[22] Filed: Sep. 6, 1977

Related U.S. Application Data

[63] Continuation of Ser. No. 694,079, Jun. 9, 1976, abandoned.

[51] Int. Cl.³ .................... B65G 15/60; B65G 39/16
[52] U.S. Cl. ........................... 198/840; 198/842; 56/341; 474/167
[58] Field of Search ............ 198/837, 840, 842, 843; 74/240, 241; 56/341

[56] References Cited

U.S. PATENT DOCUMENTS

| | | | |
|---|---|---|---|
| 3,186,536 | 6/1965 | Hinchcliffe | 198/840 |
| 3,308,929 | 3/1967 | Shriver | 198/840 |
| 3,812,732 | 5/1974 | Conrad | 74/240 |
| 3,931,702 | 1/1976 | Soteropulos et al. | 56/341 |
| 3,981,391 | 9/1976 | Phillips et al. | 56/341 |

*Primary Examiner*—Joseph E. Valenza

[57] ABSTRACT

A flexible endless belt in a belt-type conveyor for an agricultural machine has a central rib bonded to its inside surface, the construction and cross section of the rib being similar to that of a power transmission-type V belt. The conveyor rollers have central V-shaped grooves to mate with the rib on the belt. The conveyor is driven through an end roller, power being transmitted to the belt by the combined frictions between the roller and the flat and V sections of the belt respectively. On an idler roller at the other end of the conveyor, a pair of raised annular ridges straddle the V-shaped groove, thus increasing belt tension adjacent the groove and ensuring that of the forces controlling the tracking of the belt on the rollers, those deriving from the V belt in the V-shaped groove are dominant so that the belt tracks straight and remains centered on the rollers.

8 Claims, 2 Drawing Figures

ENDLESS BELT CONVEYOR

This is a continuation, of application Ser. No. 694,079, filed June 9, 1976 now abandoned.

BACKGROUND OF THE INVENTION

This invention relates to endless belt conveyors and more particularly to an improved roller for such a conveyor, especially in an agricultural machine application usig a flat belt combined with an integral V belt section.

Conveyors in which an endless flexible flat belt is trained around a series of cylindrical rollers, one or more of which is driven so as to drive the belt through friction between the belt and roller, are well known. As is also known, it is sometimes difficult to control the tracking of such belts which may not remain centered on the rollers, but run to one side or the other possibly damaging the belt and interfering with the function of the conveyor. This is particularly true with relatively short wide conveyors using belts of heavy construction which are typical of some agricultural machines such as large round balers.

In farm equipment applications, the machine environment frequently imposes limitations on the proportions of the conveyor, and the roller diameter may be small in relation to belt width. In such a conveyor there may be insufficient friction between roller and belt to drive the belt reliably and friction may be increased by a modification of the belt/roller system which includes the equivalent of a V belt section bonded to the inside of the belt engaging a V-shaped groove formed in the plain cylindrical roller. The conveyor thus becomes a "dual belt" system, a combination of V and flat with neither the V nor the flat dominant. The tracking of such a system is unpredictable and unreliable, particularly if the payloading of the belt is heavy, intermittent and nonuniform as is typical in agricultural crop material conveying.

The V belt in conjunction with the V-shaped groove has a strong guiding or tracking potential because of its well defined physical form. However, in the "dual belt" where the V section is combined with the flat, lateral forces developing in the flat portion of the belt, for example, due to misalignment of rollers or bias in the belt construction, or belt joint configuration, can so bias the V belt section sideways as to cause it to ride out of its groove. Even if belt roller adjustment is made regularly, paying meticulous attention to roller alignment and belt tension, these conveyors are still prone to work interruption and belt damage through mistracking, principally because of the tendency of the V belt section to ride out of its groove, especially on an idler roller, allowing the conveyor belt to run off track and afoul of other parts of the machine.

SUMMARY OF THE INVENTION

Accordingly, it is an object of the present invention to provide an improved conveyor using a combination flat and V belt particularly suitable for an agricultural machine and capable of tracking reliably while conveying material under a wide range of conditions of loading both with respect to weight and uniformity, and in which tracking is relatively insensitive to belt tension and roller alignment.

It is a feature of the invention to modify the surface of a V-shaped groove conveyor roller in the vicinity of the groove so that, of the forces influencing the tracking of the belt, those deriving from the V belt become dominant. In particular, the roller diameter is increased immediately adjacent both sides of the V-shaped groove so as to concentrate the circumferential belt tension forces in the vicinity of the V belt section and thus increase the radial forces holding the V section in the groove and overcoming those lateral forces in the flat section of the belt tending to ride the V section out of the groove.

DESCRIPTION OF THE PREFERRED EMBODIMENT

The invention is embodied in a baler of the type where a large cylindrical bale of crop material is formed off the ground and discharged rearwardly after the bale is fully formed. A machine of the above general type is described in detail in U.S. Pat. No. 3,931,702, which has an assignee common to the present invention, and only a summary of the description of the conventional parts of the embodiment is given here.

The machine includes a mobile main frame indicated generally by the numeral 10 mounted on a pair of wheels 12 at opposite sides of the frame. An implement tongue 14 extends forward from the frame for connection to a pulling vehicle in the conventional manner. The frame also includes a pair of upright fore-and-aft side panels or walls 16 that form the opposite sides of a baling zone or chamber.

Figure 1:
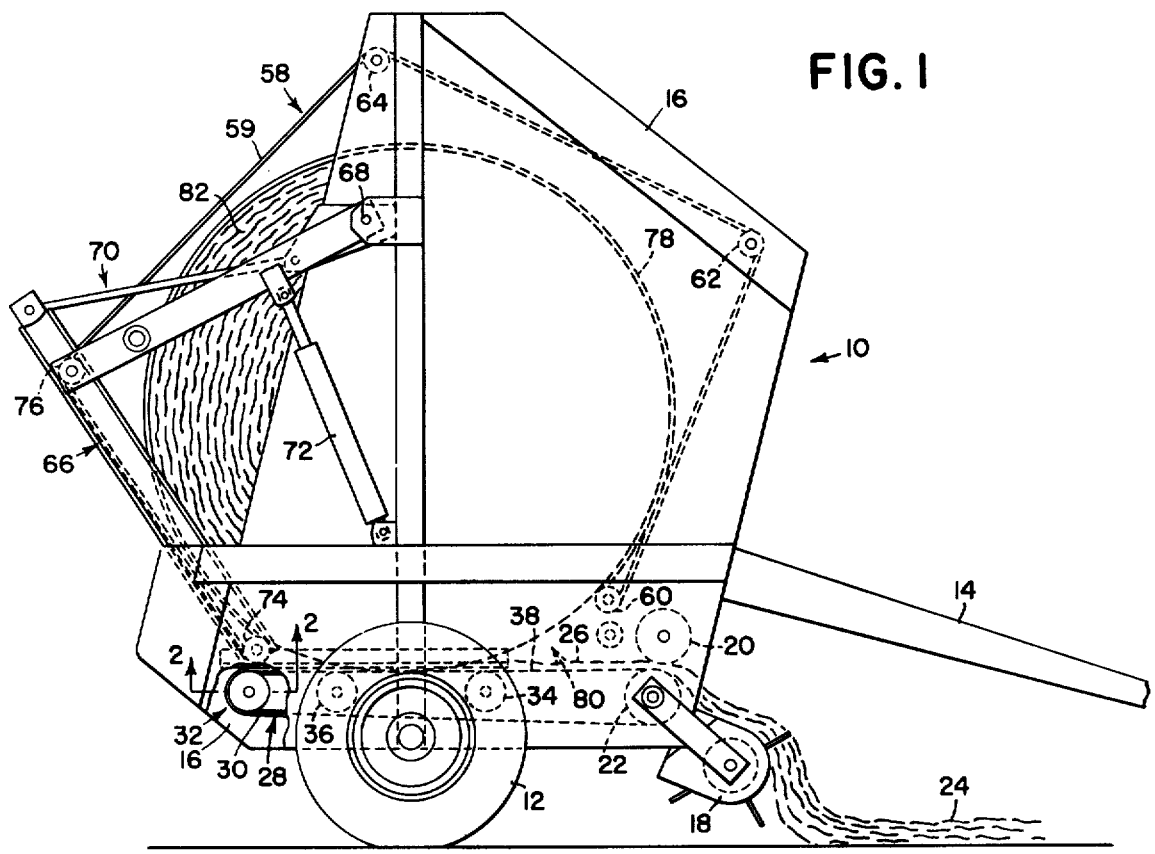
FIG. 1 is a semi-schematic side elevation of a machine for forming cylindrical bales with a side panel partially cut away to reveal a lower conveyor, and particularly a rear roller, embodying the invention.

A pickup mechanism indicated by the numeral 18 is mounted on the main frame at the front of the machine. A pair of vertically spaced transverse oppositely rotating compressor rolls 20 and 22 extend between the opposite side panesl 16 immediately to the rear of the pickup mechanism. As shown in FIG. 1, the pickup mechanism elevates the crop laying in a windrow 24 and delivers it upwardly and rearwardly to the bite of the compressor rolls 20 and 22, which engage the crop and pass it rearwardly between the rolls in a mat 26.

The mat of crop material leaving the compressor rolls is deposited on top of a lower conveyor indicated generally by the numeral 28. The lower conveyor is formed by an endless flexible belt indicated generally by the numeral 30, which extends between the opposite side panels 16 and is trained around the lower compressor roll 22 and a rear roller indicated generally by the numeral 32, which also extends between the opposite side panels. A pair of intermediate rollers 34 and 36 also extend between the opposite side panels and engage the underside of the upper run 38 of the belt, the rollers 32, 34 and 36 being parallel to and lying in substantially the same horizontal plane as the lower compressor roll 22 so that the upper run 38 of the belt 30 is substantially horizontal.

The lower conveyor is driven through the lower compressor roll 22 so that the upper run 38 of the conveyor belt moves rearwardly, the drive system for the baler (not shown) also being described in U.S. Pat. No. 3,931,702. Provision is made (but not shown in the drawings) for adjusting the belt tension through fore-and-aft movement of the mounting of the rear roller 32 in the side walls 16.

Figure 2:
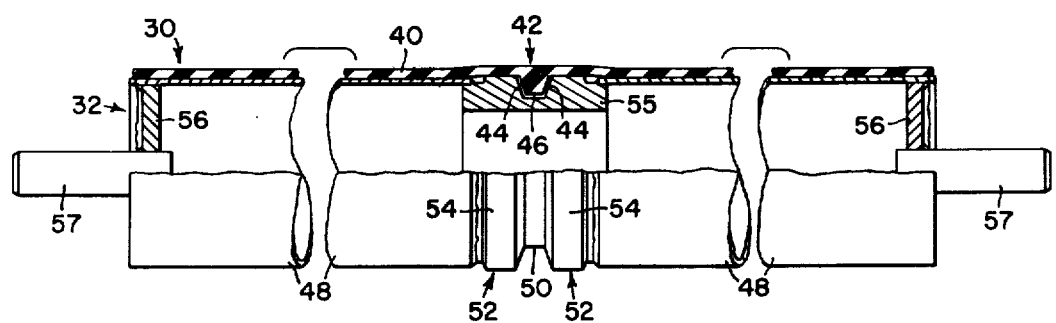
FIG. 2 is an enlarged partial sectional view on line 2—2 of FIG. 1 showing the rear roller of the lower conveyor and a conveyor belt in an operating relationship.

As indicated in FIG. 2, the belt 30 comprises essentially a flat portion 40 of substantially uniform thickness and an integral continuous central rib indicated generally by the numeral 42 extending from the inner surface of the belt. The cross section of the rib 42 is similar to that of belts used in conventional V belt drives and has a pair of opposite inclined sides 44 and a flat bottom 46, and the rib contributes to both the driving and guiding of the conveyor belt 30.

The lower compressor roll 22 and the two intermediate rollers 34 and 36 are all cylindrical rollers, each having a central V-shaped groove to accommodate the rib 42 of the conveyor belt 30. In the lower compressor roll 22, the V-shaped groove (not shown in the drawings) is proportioned so that the belt rib 42 drivingly engages the groove while the flat portion 40 of the belt engages the remainder of the roller surface over its full width, the belt 30 and roller 22 cooperating in effect to provide a "dual belt" drive, that is a combination of V belt and flat belt drives.

In each of the intermediate rollers 34 and 36, the V-shaped groove (not shown in the drawings) has only a supplementary guidance function and is proportioned to provide a small amount of clearance for the inclined sides 44 and bottom 46 of the rib 42 so that the flat portion of the belt 40 runs flat on the cylindrical surfaces of the rollers 34 and 36.

The rear roller 32 also has cylindrical outer tubular portions 48 and a central annular V-shaped groove 50 providing running clearance for the belt rib 42 as shown in FIG. 2. In addition, the rear roller 32 carries a pair of annular ribs or ridges indicated generally by the numeral 52 straddling the groove 50 and contiguous with it. The ridges 52 each have a cylindrical top surface 54 concentric with but somewhat greater in diameter than the outer portions 48 of the roller while the bottom of the groove 50 has a lesser diameter than the outer portion of the roller.

Preferably, the central portion of the roller, including the ridges 52 and the groove 50, is made a machined annular member 55, having a diameter on the outer sides of the ribs that is substantially the same as the inside diameter of the tubular portions 48, which receive and are secured to the opposite sides of the member 55. The roller also includes a pair of end disks 56, respectively secured to the outer ends of the tubular portion 48, and a pair of axial stub shafts 57 are respectively secured to the end disks 56.

As can be seen from FIG. 2, when the belt 30 is suitably tensioned for field operation of the baler, the flat portion 40 of the belt conforms somewhat to the ridged profile of the center part of the roller 32, thus increasing locally the circumferential tension in the belt and hence the radial reaction between the belt 30 and the roller 32, so as to overcome any tendency for the rib 42 of the belt to ride out of the roller groove 50 through contact between the inclined sides 44 of the rib and the sides of the groove 50, should the belt 30 wander from its true track.

The ridges 52 are successful in achieving improved belt stability only if suitably proportioned. For example, too great an outside diameter of the top surfaces 54 of the ridges may cause the belt 30 to run with an excessive and objectionable transverse arching of the flat portion 40 and actually contribute to belt instability. On the other hand, a certain minimum diameter for the ribs must be exceeded or belt stability is not improved over a simple cylindrical roller with a V guide. In conveyors with a high ratio of belt width to roller diameter, typical of agricultural machinery applications, a preferred dimension for the width of the top surface 54 of each ridge 52 is approximately 1/60 to 1/20 of the total belt width and about five to fifteen times the nominal thickness of the flat portion 40 of the belt. Preferably the outside diameter of the top surfaces 54 of the ridges 52 should exceed that of the outer portions of the roller 48 by approximately two to three times the nominal thickness of the flat portion 40 of the belt. These proportions have worked well for example in a conveyor having a length of 58 inches with a belt width of 60 inches, belt thickness of 0.185 inches and V section top width of 0.88 inches, in combination with a six inch diameter roller.

An upper bale-forming conveyor, indicated generally by the numeral 58 and shown in FIG. 1, is also disposed between the opposite side panels 16 and includes a plurality of side-by-side elastic endless belts 59, which are transversely spaced a relatively small distance apart and extend across the width of the machine. The belts 59 are trained around a transverse lower front roller 60, which extends between the opposite side panels rearwardly of the upper compressor roll 20, a transverse upper front roller 62 and a transverse upper rear roller 64, which also extends between the opposite side panels.

An articulated rear gate assembly indicated generally by the numeral 66 allows rearward discharge of the formed bales. The gate assembly is pivoted to the main frame on a pair of transverse pivots 68 and includes a linkage, indicated generally by the numeral 70. The gate assembly is controlled by a pair of hydraulic cylinders 72 and is described in greater detail in U.S. Pat. No. 3,931,702.

A lower rear transverse roller 74 and a rear transverse roller 76 are carried by the gate assembly 66 and extend the full width of the bale chamber. The upper conveyor belts 59 are trained around rollers 74 and 76 as well as rollers 60, 62, and 64 and all five rollers engage the inner sides of the belts.

While the upper run 38 of the lower conveyor is driven rearwardly during the baling process as described above, the lower run of the upper conveyor, which is opposite the lower conveyor, is driven forwardly. The portion of the upper conveyor belts 59 extending between the lower rear roller 74 and the fixed lower front roller 60 is the bale-engaging portion 78 of the upper conveyor. The area or zone between the upper run 38 of the lower conveyor and the bale-engaging portion 78 of the upper conveyor defines a baling zone identified by the numeral 80 in FIG. 1. As is apparent from FIG. 1, as the compressor rolls 20 and 22 feed the mat of material into the baling zone 80, it is engaged by the two oppositely moving conveyors in such a manner that the material is rolled into a cylindrical bale 82, the bale 82 being shown early fully formed in FIG. 1. The rear roller 74 defines the rearward end of the baling zone 80, and as the bale grows, the gate assembly swings rearwardly carrying the lower rear roller 74 rearwardly until it reaches the position shown in FIG. 1.

During formation, the bale is supported from below on the upper run 38 of the lower conveyor while the bale-engaging run 78 of the upper conveyor substantially engages the periphery of the remainder of the bale. The increasing bale size, of course, requires additional length of the bale-engaging run of the upper conveyor and the necessary belt length is provided by the elastic extension of the upper conveyor belts 59.

As previously described, as the bale 82 grows, the roller 74 moves rearwardly to accommodate the increase in bale size, the cylinders 72 allowing free movement of the rear gate assembly. Once the bale reaches its full size, the operator actuates the cylinders 72 so that they swing the gate assembly rearwardly and upwardly, providing clearance for the bale 82 to be carried rearward by lower conveyor 28 and discharged onto the ground.

After the bale 82 clears the machine, the operator retracts the cylinders 72 to move the gate assembly back to its original position (not shown) in preparation for the inception of formation of another bale.

It will be appreciated that during formation, the growing bale 82 is constantly rolling on the upper run 38 of the lower conveyor belt. At the same time the belt is supported by the intermediate rollers 34 and 36 directly beneath the bale so that the flat portion of the belt 40 is subjected to a rolling and squeezing action as well as to varying tension. Because of such uncontrollable variables as the compaction of the window 24 and uneven terrain, the belt stresses constantly vary across the width of the conveyor so that the net tracking force frequently has a side component tending to run the belt 30 off the rollers. This is counteracted by the dominating guiding force of the V section 42 of the belt in the groove 50 responsive to the locally increased belt tension caused by the raised ridges 52 of the roller 32.

I claim:

1. A belt-type conveyor comprising:
   a plurality of substantially cylindrical rollers, at least one of which includes a circumferential groove having opposite walls and a bottom surface, disposed remote from the roller ends and carries on its cylindrical surface a pair of axially spaced flat-topped, raised annular ridges said ridges closely bracketing the groove; and
   an endless flexible belt, having an inner surface and a rib having opposite sides extending from the inner surface parallel to the direction of belt travel, trained around the rollers so that the inner surface of the belt engages the cylindrical surface and ridges of said roller and the rib engages the groove so as to guide the belt.

2. The invention defined in claim 1 wherein the groove is substantially equidistant from the ends of the roller.

3. The invention defined in claim 2 wherein the opposite walls of the groove are inclined so as to form a V-shaped groove and the opposite sides of the rib have an angle of inclination matching that of the walls of the groove and further comprising a second roller having an annular V-shaped groove engaging the rib of the belt.

4. The invention defined in claim 3 wherein the belt drivingly engages the cylindrical surface and V-shaped groove of the second roller.

5. In a machine for forming cylindrical bales of crop material including a generally horizontal endless belt conveyor having a belt of substantial width trained around at least two rollers, said belt having a raised rib on its inner surface parallel to the direction of belt travel and remote from the edges of the belt, the combination therewith of an improved roller for the conveyor comprising:
   a cylindrical body having a circumferential groove remote from the ends of the body, said groove having opposite side walls; and
   two annular ridges carried by the body and respectively contiguous with and extending the opposite groove walls, the crest of each ridge comprising a cylindrical surface greater in diameter than the body but concentric with it and the groove being adapted to receive and guide the rib of the conveyor belt.

6. A belt-type conveyor for an agricultural machine comprising:
   a first roller having a generally cylindrical body including a circumferential V-shaped groove concentric with the body having opposite sides and disposed remote from the roller ends and a pair of axially spaced raised annular ridges, each ridge respectively bordering an opposite side of the groove and having a flat crest concentric with the body;
   a second roller having a generally cylindrical body with an annular V-shaped groove concentric with the body; and
   an endless flexible belt having an inner surface and a V-shaped rib parallel to the direction of belt travel extending from that surface, trained around the rollers so that the inner surface engages the bodies and ridges of the rollers, and the rib mates with the V-shaped grooves in the rollers, drivingly engaging the V-shaped groove in at least one of the rollers.

7. The invention defined in claim 6 wherein the machine includes a power source and the second roller is driven by the power source on the machine and drives the belt.

8. The invention defined in claim 7 wherein the conveyor has an upper run and a lower run and the direction of driving is such that upper run runs onto the first roller.

* * * * *